Feb. 6, 1940.  J. GAUSSOIN  2,189,170
TRAILER CONSTRUCTION
Filed March 5, 1938  3 Sheets-Sheet 2
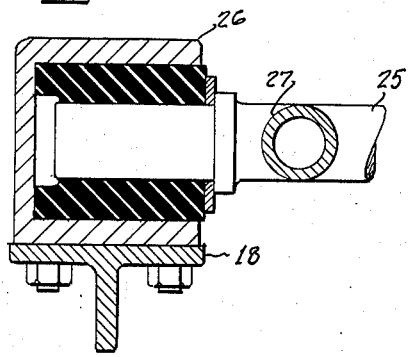
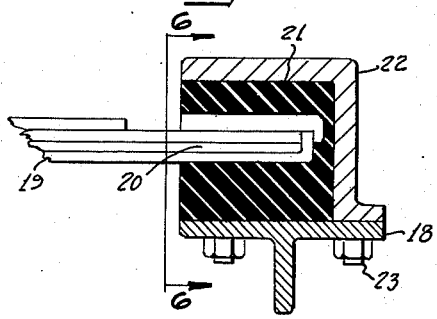
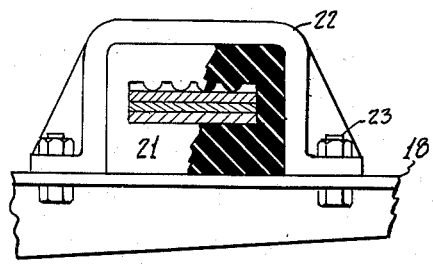
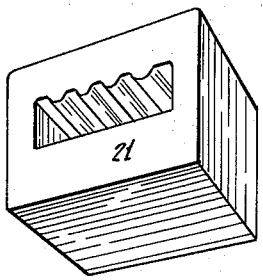
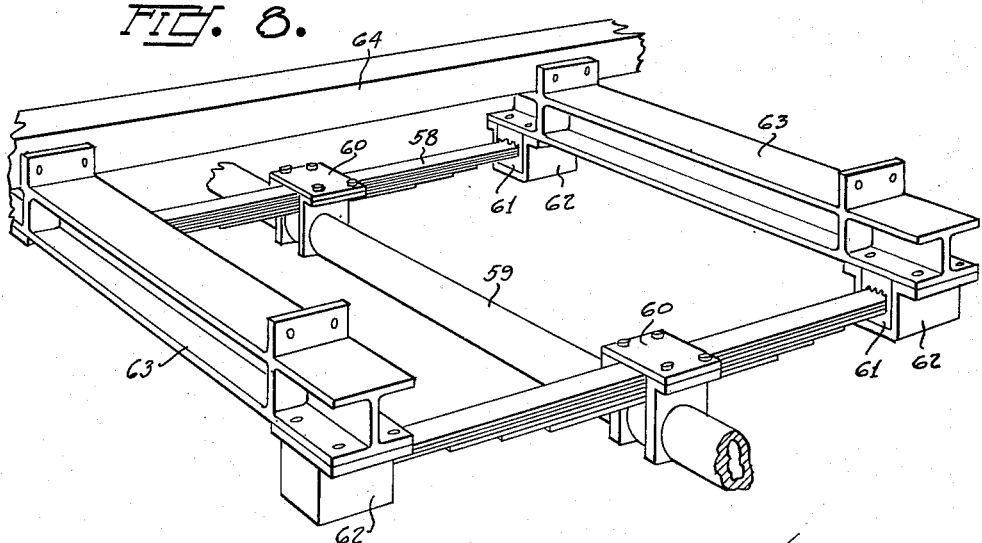
INVENTOR
JULIUS GAUSSOIN
ATTORNEY

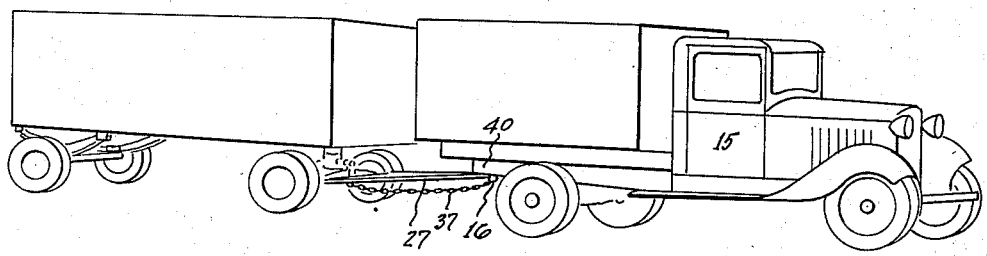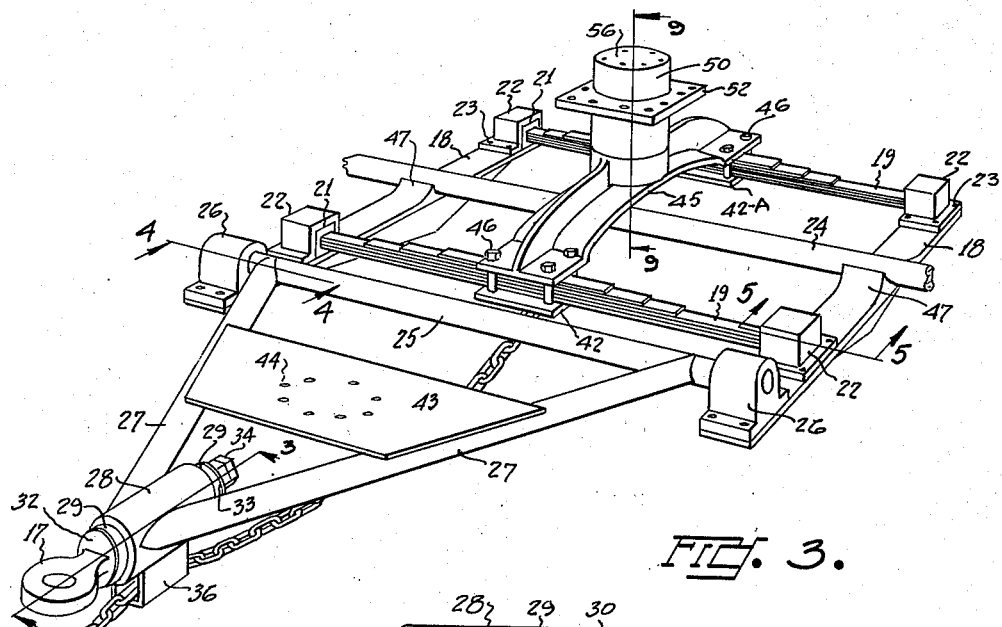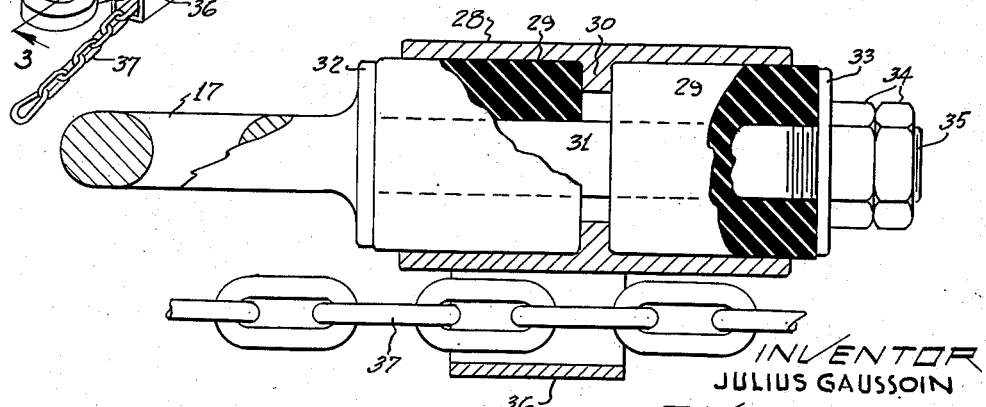

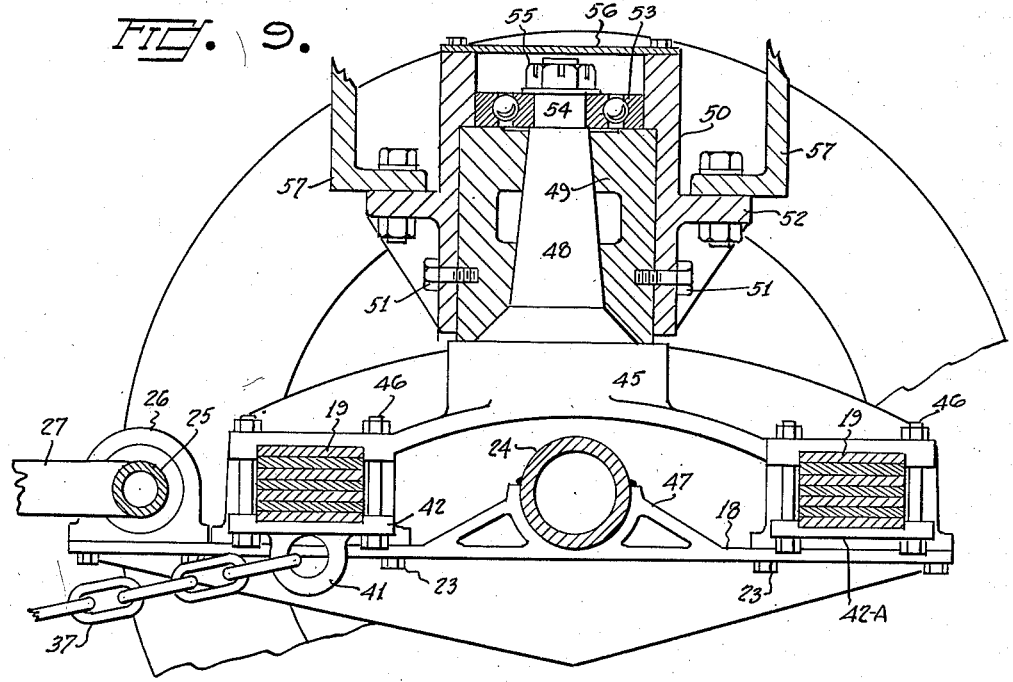
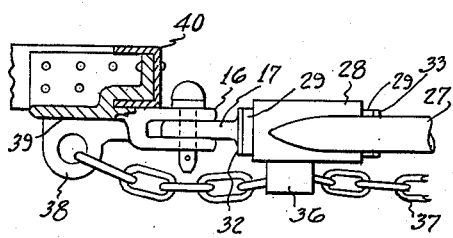
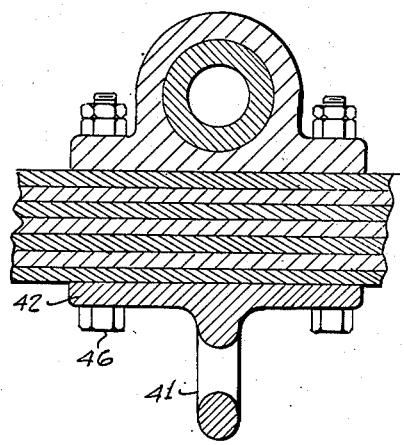
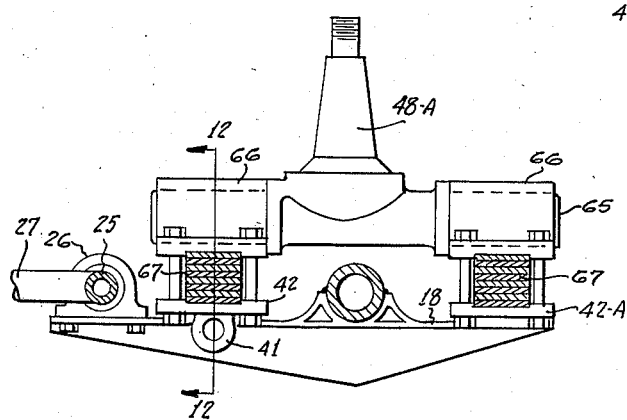

Patented Feb. 6, 1940

2,189,170

UNITED STATES PATENT OFFICE 2,189,170

TRAILER CONSTRUCTION

Julius Gaussoin, Portland, Oreg.

Application March 5, 1938, Serial No. 194,137

2 Claims. (Cl. 280—123)

This invention relates generally to land travelling vehicles, and particularly to a trailer construction.

The main object of this invention is the design of a trailer construction wherein road shocks will be absorbed before they reach the load and whereby the length of life of the vehicle will be increased due to such action and the load itself will be guarded against shocks and vibrating actions.

The second object is the construction of a vehicle of the class described which will adapt itself better to trailing under bad road conditions and which will greatly add to the length of the rubber tires on the wheels of the vehicle.

I accomplish these and other objects in the manner set forth in the following specification as illustrated in the accompanying drawings, in which:

Fig. 1 is a perspective view showing a hauling truck and a trailer vehicle disposed behind same.

Fig. 2 is a perspective view of the preferred form of mounting.

Fig. 3 is a section taken along the line 3—3 in Fig. 2.

Fig. 4 is a section taken along the line 4—4 in Fig. 2.

Fig. 5 is a section taken along the line 5—5 in Fig. 2.

Fig. 6 is a section taken along the line 6—6 in Fig. 5.

Fig. 7 is a perspective detail view of a rubber block mounting for the spring ends.

Fig. 8 is a perspective view of a rear axle mounting.

Fig. 9 is a vertical section taken along the line 9—9 in Fig. 2.

Fig. 10 is a fragmentary longitudinal section through the hauling coupling and safety chain.

Fig. 11 is a longitudinal section through a modified form of mounting.

Fig. 12 is a fragmentary section taken along the line 12—12 in Fig. 11.

Similar numerals refer to similar parts throughout the several views.

Referring in detail to the drawings, there is shown the regular form of truck 15, the exact nature of which is unimportant except that it is provided with some form of hitch 16 to which may be attached the eye 17 of my improved hauling connection shown best in Figs. 2, 3 and 10.

The trailer construction itself consists of a pair of longitudinal side frames 18 across which are mounted the transverse springs 19 whose ends 20 are embedded in the rubber blocks 21 which are confined within the housings 22 which in turn are secured to the side frames 18 by means of the bolts 23. The axle 24 is secured across the frames 18 approximately mid-way between the springs 19.

The trailer tongue consists of a transverse bar 25 which journals in the rubber bushed blocks 26 mounted on the forward ends of the frames 18 and the bar 25 has attached thereto the forwardly extending tongue members 27 which meet at the cylindrical sleeve 28 to which they are secured.

Within the sleeve 28 are disposed the rubber blocks 29 between which extends the inturned flange 30. Through the blocks 29 extends the shank 31 of the coupling eye 17. The shank 31 is provided with a flange 32 and washer 33 between which the blocks 29 are disposed. The nuts 34 are placed on the threaded end 35 of the shank 31 to hold the blocks 29 in compression.

On the underside of the sleeve 28 is formed an elongated eye 36 which forms a support for the safety chain 37, one end of which is attached to the eye 38 in the draw bar plate 39 which is secured to the truck frame 40 while the other end is attached to the eye 41 which is disposed on the underside of the spring clamp 42.

It is desirable to provide a flat plate 43 across the tongue members 27 and to provide same with bolt holes 44 for the fastening of a spare tire thereon.

It can be seen in Figs. 2 and 9 that an arch frame 45 is placed across the springs 19 and is secured thereto by means of the bolts 46 and the spring clamps 42 and 42—A. The arch 45 is sufficiently high to clear the axle 24 which is welded to the saddles 47.

Projecting upwardly from the arch 45 is a tapering spindle 48 which extends through the cylindrical bearing 49 which in turn is encased in the housing 50 and secured thereto by means of the bolts 51. The flange 52 extends around the housing 50. An anti-friction bearing 53 is mounted in the upper end of the housing 50 and supports the reduced portion 54 of the spindle 48. A nut 55 is placed on the upper end of the spindle 48 and holds same in position. A cover plate 56 extends across the top of the housing 50. The flange 52 is secured to the cross members 57 of the trailer frame.

In Fig. 8 is shown a form of rear axle mounting wherein the springs 58 are secured to the axle 59 by means of the clamp 60 and the ends of the springs 58 are imbedded in the blocks of rubber 61 which in turn are held by the casings 62 which are secured to the undersides of the transverse members 63 which in turn are secured to the longitudinal truck frame members 64.

It will be noted that in the present design I employ two transverse springs, one in front of and one behind the trailer axle and that the load is supported between the two springs on the spindle 48 which is mounted in the bearing 49 which in turn is mounted in the trailer frame assembly.

With this arrangement under a static condition the load is balanced equally between the two transverse springs 19. In operation the load will vary from one transverse spring to the other dependent upon the draft transmitted by the towing truck or by the compression caused by shock from the road bed or the braking torque. Since this load is transmitted from one spring 19 to the other in proportion to the resistance of said variables the amount of deflection of the springs 19 does not vary in proportion to the load transmitted but in proportion to the rate of deflection. Since the resistance per inch of deflection on a leaf spring becomes greater as the load is increased when the load is transmitted from one spring to the other, the deflection of the spring which carries the additional load is relatively small and since the spring that carries the lesser load has a greater reaction than the action of the spring which carries the greater load when a hole or shock is encountered on a road bed, the distance between the trailer axle and the fifth wheel assembly is changed very little; whereas, in the conventional design when a shock is encountered the deflection of the springs must be equal to the difference in the road bed if the trailer body is to remain on an approximately even keel.

This rocking action caused by either draft or shock is absorbed entirely by the two transverse springs 19 and as their deflection changes, the wheel base of the trailer changes slightly which helps absorb the shock or draft imparted to the front end assembly; whereas, the conventional design cannot absorb any draft or shock except in a vertical direction.

It is a matter of common knowlegde that the more shock that can be absorbed in the spring suspension under any type of vehicle, the less will be the resulting shock which will be imparted into the body and the greater the shock imparted, the shorter will be the life of any unit that receives the shock.

The hub or bearing assembly 48 and 49 which keeps a constant distance between the trailer frame and the two transverse springs 19 is of unique design because it is self-adjusting and can be lubricated so that there is no loss of lubricant. Hence, for all practical purposes enough lubricant can be put in a new unit to last its lifetime. It will be understood that the cover plate 56 can be removed for the purpose of packing the space beneath same with grease should this ever be found necessary.

In most trailer constructions the so-called fifth wheel connection ordinarily is subject to much wear due to limited bearing surface and insufficient lubrication. With my construction there is provided the grease seal above the bottom of the bronze bearing 49 which is machined to a tapered seat and which fits upon the tapered spindle 48 and has an anti-friction pilot bearing 53 at the top of the spindle to keep it in true alinement with the bearing, this unit being covered with the plate 56 excludes all foreign particles and retains the lubricant within the housing 50.

In most of the conventional type of fifth wheel with a surface riding upon a surface, wear is rapid and no adjustment is provided and it is difficult to keep such devices even partially lubricated since no provision is made for retaining the lubricant.

In all other types of fifth wheels which use a roller or ball bearing to carry the load, the bearings pocket into the seats very quickly because the fifth wheel oscillates instead of rotating, therefore, one small portion of the seat continually takes the wear off one of the rollers or balls, whereas if the fifth wheel is rotated, the ball makes a complete rotation about its seat rather than wearing in one small area. When this pocketed condition exists, turning or movement of the fifth wheel is restricted.

With my construction it is possible to mount the tongue low on the trailer so that it would be disposed underneath the frame of the towing unit. It is advantageous to mount the pintle hook on the towing vehicle as close to the rear axle as possible to prevent the trailer from being towed in the opposite direction from the one in which the truck is turning which happens in ratio to the distance which the pintle hook is mounted behind the rear axle of the towing vehicle.

With my construction the front axle of the trailer will be pulled directly behind the truck in case of spring breakage whereas with the conventional design in event of the loss of the radius rod or the breakage of a spring, the front axle will slip back on the one side and tow out of line resulting in damage to itself or other property.

One of the outstanding advantages of my device resides in the fact that the towing action is true and steady. That is, the trailer does not swerve from side to side due to slackness in the hitch or in the various connections, thereby reducing the tendency toward accidents and greatly reducing the amount of wear on the tires themselves since the wheels are not being continually steered to and from the line of travel.

In the form of the device shown in Fig. 11, there is shown a spindle 48—A which is mounted on a longitudinal rock shaft 65 which journals in the bearings 66 which in turn are mounted on the springs 67 which correspond with the springs 19 in the first described form of the device. The purpose of this construction is to render the device adjustable to use under extreme and unusual road conditions since it entirely relieves the spindle 48—A from lateral strains ordinarily occasioned by unequal loading of the various portions of the several springs 67.

I claim:

1. A trailer construction having in combination an axle having ground engaging wheels disposed at the outer ends thereof and having side frames attached to said axle normal thereto, a pair of transverse springs mounted across said side frames on opposite sides of said axle, said springs having resilient connections to said side frames, an arched frame supported by said springs extending over said axle and having a tapering spindle projecting upwardly therefrom, a tapering bearing on the lower end of said spindle, an anti-friction bearing at the upper end of said spindle, a housing containing both of said bearings and constituting a grease reservoir, cross members attached to said housing constituting a support for a trailer frame and a tongue attached to the forward end of said side frames including a resilient draw bar connection and a safety chain connection the rear end of which is attached to said arched frame.

2. A device of the class described having in combination a trailer axle including ground engaging wheels mounted thereon, a pair of longitudinal side frames attached to said axle, transverse springs mounted on said side frames by means of rubber mountings, a longitudinal arched frame supported across said springs having a tapering spindle projecting upwardly therefrom, a tapering bearing for receiving the lower end of said spindle, an anti-friction bearing at the upper end of said spindle, a housing for both of said bearings, the upper portion of which constitutes a grease chamber, a cover over said housing and cross members attached to said housing.

JULIUS GAUSSOIN.